US006958107B1

(12) United States Patent
Clarke et al.

(10) Patent No.: US 6,958,107 B1
(45) Date of Patent: Oct. 25, 2005

(54) CYCLONIC EVAPORATOR

(75) Inventors: Neville Clarke, Berwick (AU); Paul Woodley, Pakenham (AU)

(73) Assignee: Alcos Technologies Pty Ltd, (AU)

( * ) Notice: Subject to any disclaimer, the term of this patent is extended or adjusted under 35 U.S.C. 154(b) by 0 days.

(21) Appl. No.: 09/806,557

(22) PCT Filed: Sep. 30, 1999

(86) PCT No.: PCT/AU99/00836

§ 371 (c)(1),
(2), (4) Date: Oct. 17, 2001

(87) PCT Pub. No.: WO00/18483

PCT Pub. Date: Apr. 6, 2000

(30) Foreign Application Priority Data

Sep. 30, 1998 (AU) ..................... PP6242

(51) Int. Cl.$^7$ ................................. B01D 1/00
(52) U.S. Cl. ................. 159/2.1; 159/17.1; 159/29; 202/175; 203/88; 203/63
(58) Field of Search ................. 208/184, 352, 208/357, 361, 362; 159/17.1, DIG. 16, 2.1, 159/29; 203/88, 63; 202/175

(56) References Cited

U.S. PATENT DOCUMENTS

| | | | | |
|---|---|---|---|---|
| 3,862,014 A | * | 1/1975 | Atkins et al. | ............... 202/204 |
| 4,941,330 A | * | 7/1990 | Williamson | .................. 62/515 |
| 5,009,784 A | * | 4/1991 | Clarke et al. | ............ 210/512.1 |
| 5,814,207 A | * | 9/1998 | Kenton | ........................ 208/184 |
| 5,819,955 A | * | 10/1998 | Clarke | ........................ 209/732 |
| 5,840,198 A | * | 11/1998 | Clarke | ........................ 210/802 |
| 5,901,271 A | * | 5/1999 | Benzing et al. | ............. 392/387 |
| RE38,366 E | * | 12/2003 | Kenton | ........................ 208/148 |

FOREIGN PATENT DOCUMENTS

| | | | |
|---|---|---|---|
| EP | 0 747 102 | * | 12/1996 |
| EP | 0 873 773 | * | 10/1998 |
| GB | 2 268 418 | * | 1/1994 |
| WO | WO 91/17804 | * | 11/1991 |

* cited by examiner

*Primary Examiner*—N. Bhat
(74) *Attorney, Agent, or Firm*—Michael Best & Friedrich LLP

(57) ABSTRACT

A method and apparatus for separating the components of a feed material prior to or simultaneously with at least partially vaporizing one of the components is described. The apparatus comprises at least one inlet (8) for admitting the feed material (10) containing the two components to the apparatus (2) wherein a device for introducing a first movement to the feed material is located, such as, for example, an in-line swirl generator (14), which imparts a swirling movement to the feed material to partially separate the components into two swirling flows. The partially separated material on emerging from the in-line swirl generator (14) is in an evaporation tube (20) in which the more volatile component is vaporized to further assist in separating the two components into a liquid component and a gaseous or vapor component. The liquid component and the vapor phase are discharged from the apparatus in two streams through the same outlet (36). Modifications of the method and apparatus include (i) having multiple evaporation tubes (20), each optionally provided with its own in-line swirl generator to facilitate better distribution and separation of the feed material, and (ii) having a reject nozzle (40) and reject conduit (42) located within the generator for allowing passage of vapor or gas through the in-line swirl generator (14) when there is an intermediate flow formed in the generator (14) and conveyed to the evaporation tube (20). The method and apparatus of this application are used as a pre-treatment in an overall separation plant.

25 Claims, 4 Drawing Sheets

CYCLONIC EVAPORATOR

The present invention relates generally to a method and apparatus for separating two or more components of a feed material, particularly a waste stream from an industrial or chemical process containing two or more components from which stream it is desired to recover or recycle one or other of the components. More particularly, the present invention relates to a method and apparatus for separating or for facilitating separation of two or more liquid components where the liquids have differing properties, such as for example different specific gravities and/or different boiling points. Even more particularly, the present invention relates to a cyclonic evaporator and to a method of using a cyclonic evaporator to separate liquid components from each other and to recover and/or recycle one or more of the liquid components, in which the cyclonic evaporator is provided with a hydrocyclone stage and an evaporator stage. The present invention finds particular application as an improvement to evaporators for separating liquid components from each other in which the improvement is providing a hydrocyclone stage before the evaporator stage in order to achieve more efficient distribution of the waste material to the evaporator, thereby effecting more efficient operation of the evaporator to separate the more volatile component or components of the waste material from the remaining material.

Although the present invention will now be described with particular reference to one embodiment of a cyclonic evaporator for use in separating, in one example, alcohol from aqueous waste material, and in another example water from milk solids, it is to be noted that the scope of the present invention is not restricted to the described embodiments, but rather the scope of the present invention is more extensive so as to include other arrangements of the hydrocyclonic evaporator and its use in other applications and processes, particularly for treating different materials.

Existing evaporators suffer from one or more disadvantages. One such disadvantage relates to the difficulties in separating liquids of different specific gravities or of different volatilities. This is particularly so where evaporators are used to separate volatile materials such as alcohols from aqueous waste materials or water from milk solids.

One reason for the existing difficulties of evaporators relates to the uneven distribution of incoming feed material to the evaporator tubes. In many installations, there is a distribution plate located at or towards the inlet feed, such as, for example, in the inlet chamber of the evaporator to deflect incoming feed to individual tubes. However, this plate acts as a barrier to the flow of the incoming feed material and causes uneven distribution to individual tubes, particularly where the evaporator is being fed under the influence of gravity only. The deflection and distribution of the incoming feed to individual tubes is achieved by the presence of a number of apertures arranged in a spaced apart array in which each aperture directs material to an individual tube. As the apertures in the plate are small in size they often become blocked with residues of material from the feed stream, particularly milk solids and the like. Blocking of the apertures further exacerbates the problem of uneven distribution as the apertures having reduced flow have a greater tendency to block.

Another problem with existing evaporator tubes relates to the build-up of material on the inner wall of the tubes, particularly in the region towards about the top third of the tubes due to incomplete vaporisation of one or more of the components in the feed stream. This is particularly relevant when milk solids or similar materials are present in the feed stream being treated since the milk solids, being essentially oily or fatty in nature, are only partially vaporised, and accordingly have a tendency to form a sticky residue which deposits on the upper end of the inner wall of the tube. This sticky residue attracts other residual material which in turn adds to the build-up on the walls of the tubes. The deposit of residue reduces heat transference through the wall of the tube, which in turn reduces the efficiency of the evaporator, leading to more material being deposited and so on.

It is an aim of the present invention to provide a method and apparatus which allows a feed material having two or more components to be separated into the components prior to or simultaneously with evaporation of one or more of the components, so that in combination with the evaporator the components are more effectively separated from each other.

According to a first aspect of the present invention there is provided an apparatus for separating two or more components of a material prior to or simultaneously with at least partially vaporising one of the components, said apparatus comprising at least one inlet for admitting the feed material containing the two or more components, a device for inducing a first movement to the feed material whereby the two components are partially separated from each other and at least one outlet for discharging the separated components, wherein at least one of the materials is at least partially vaporised prior to being discharged from the outlet.

According to another aspect of the present invention there is provided a method of separating one component from another component of a feed material using a cyclone evaporator comprising admitting the feed material to a part of the apparatus to impart a first movement to the feed material to enhance the chance of one of the components being vaporised, vaporising at least a part of the one component, separating the one component from the other component by the one component having a tendency to remain as a vapour in the apparatus whereas the other component has a tendency or propensity to be condensable to a liquid in the apparatus, and discharging the one and the other component from the apparatus, whereby the separation is substantially maintained.

Typically, the feed material is an aqueous based waste material or an organic solvent based waste material. More typically, the feed material is an alcohol containing aqueous waste material in which the alcohol is typically methanol, ethanol, propanol, or the like.

More typically, the waste material is a fruit juice syrup containing water residues in which it is required to separate the water from the fruit juice concentrate. More typically, the waste material is a mixture of organic materials, such as solvents, and other flammable material. Even more typically, the waste material is a water and milk solids mixture resulting from the diary industry and processes used therein.

Typically, the material being fed to the inlet of the present invention may be at any temperature to enhance separation of the two components.

Typically, at least part of one of the components of the waste material undergoes flash vaporisation on emerging from the motion imparting means of the apparatus. More typically, it is the more volatile of the two materials. Even more typically, the evaporation of the first component is continued in the evaporator. Even more typically, at least one of the components is subjected to the Ranque-Hilsch vortex tube effect, including the temperature exchanges that are produced by this effect.

Typically, the motion imparting means is a hydrocyclone, more typically a hydrocyclone head unit or body unit. Even more typically, the hydrocyclone is a single or multiple hydrocyclone having one, two, three, four or more conduits in the head or body of the hydrocyclone. More typically, the hydrocyclone is a tangential flow hydrocyclone. Preferably, the motion imparting means is an in-line swirl generator. More preferably, the velocity of the components of the waste material is increased by passage through the hydrocyclone.

Typically, the waste material fed to the in-line swirl generator is under pressure. More typically, the evaporator chamber is under vacuum so that when one or more components emerge from the high pressure zone of the in-line swirl generator to the evaporator tube, it or they undergo flash vaporisation which in turn further increases the velocity of the component or components.

The present invention will now be described by way of example with reference to the accompanying drawings in which:

BRIEF DESCRIPTION OF THE FIGURES

In FIG. 1 there is shown one form of the cyclonic evaporator of the present invention, generally denoted as 2 used, for example, in different industrial processes to separate alcohol from water or water from milk solids. Evaporator 2 comprises an upper portion in the form of a cylindrical cyclone housing 4 having an inlet chamber 6 formed inside the housing. An inlet 8 is located in the side wall of housing 4 forming chamber 6 for admitting feed material 10 into chamber 6. Typically, feed material 10 comprises two or more components such as liquids having different specific gravities and/or different volatilities, particularly an aqueous based waste water stream containing contaminants such as alcohols or other volatile components, a milk solids-containing aqueous material, or the like. It is to be noted that a wide range of different materials may be treated by the apparatus and process of the present invention, as will be described in more detail later in this specification.

Figure 1:
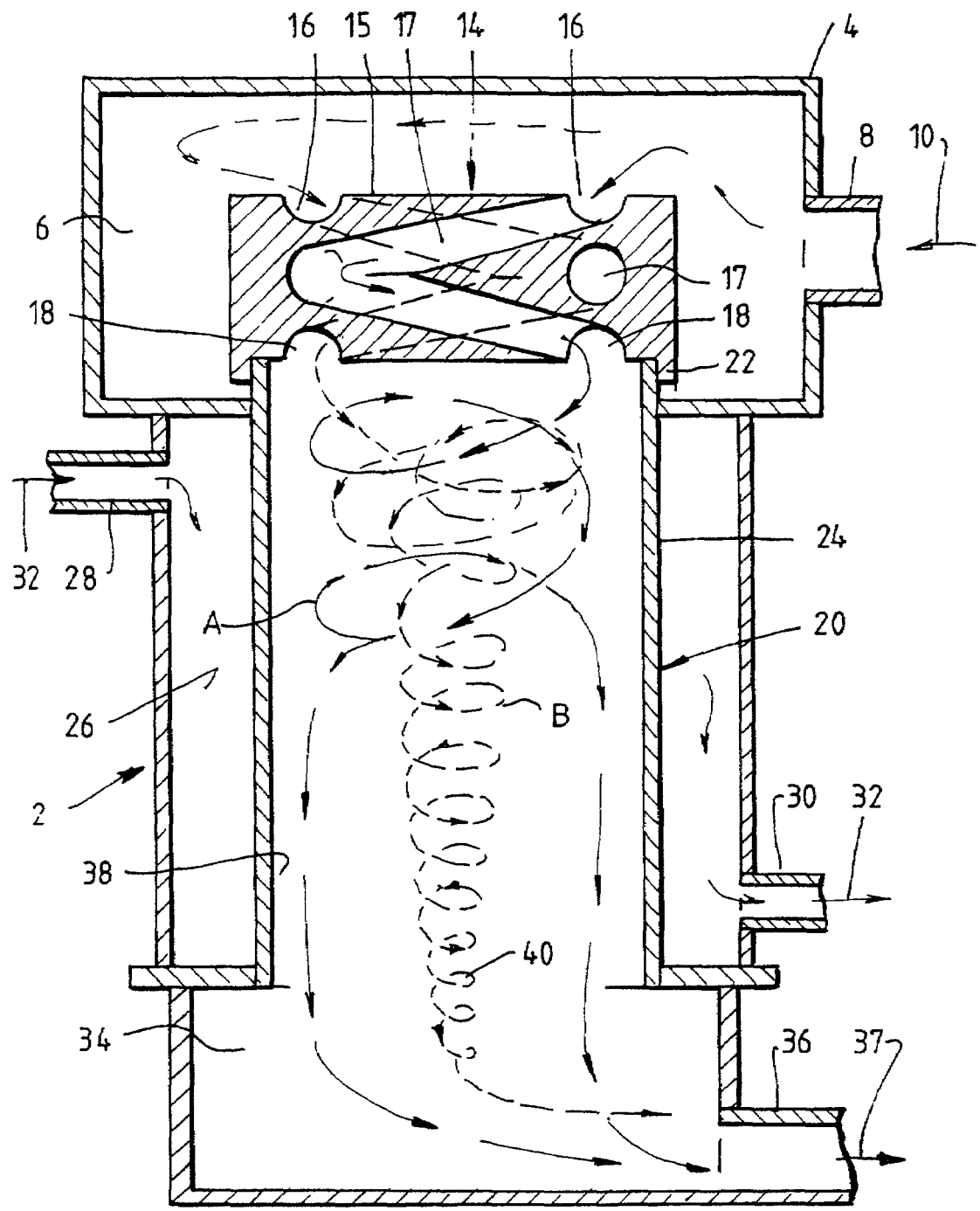
FIG. 1 is a vertical cross-sectional view of one form of the cyclonic evaporator of the present invention showing a single evaporator tube.

A motion imparting device, such as for example a hydrocyclone or similar, preferably an in-line swirl generator (ISG) 14 or similar device, is located within chamber 6. A particularly preferred form of the ISG is described in international patent application no. PCT/AU94/00456 (WO 95/04602). ISG 14 is provided with a top surface 15 in which is located a pair of spaced apart inlet ports 16 for receiving feed material 10 after it has entered chamber 6. Two substantially arcuate passages 17 are provided within the body of ISG 14 and extend from the inlet ports 16 to outlet ports 18 located in the lower surface of ISG 14. The outlet ports 18 are provided in the lower surface of the ISG 14 so that the inlet feed material is admitted to the ISG in a direction substantially parallel to the longitudinal axis of the evaporator but exits tangentially from the lower surface of the ISG in a rotating or swirling motion as shown by arrows A and B in FIG. 1 which denote the flows of the two components generally. It is to be noted that flow B is located more centrally whereas flow A is located more radially outwards.

Further, it is to be noted that any suitable motion imparting device may be used to impart a swirling, rotating, spiralling, helical flow or the like to the feed material. It is also to be noted that any suitable apparatus or device for inducing a swirling motion or the like can be used in the method and apparatus of the present invention. Further, it is to be noted that any number of materials may be present in the incoming waste feed and any number of different components can be separated, in which case there may be more than two readily identified flows A, B.

An evaporator tube 20 is sealingly connected to the lower surface in use of ISG 14 so that as the partially separated components of the feed stream emerge from ISG 14, they immediately enter the upper part of evaporator tube 20. In one example, the lower surface of the ISG is provided with a skirt 22 or similar for receiving the upper edge in use of the evaporator tube 20. A cooling jacket 26 is arranged circumferentially around the exterior of the wall 24 of the evaporator tube 20. The jacket 26 is provided with an inlet 28 for admitting coolant or other material 32, typically cold water at a relatively lower temperature, and an outlet 30 for discharging the coolant or other material at a relatively higher temperature after having heat developed within the evaporator tube transferred thereto or heat supplied to the evaporator tube 20. It is to be noted that in some embodiments material 32 may be used to heat the contents of evaporator tube 20, rather than cooling it.

Chamber 34 is provided at the base or lower part of evaporator tube 20 for receiving liquid which is condensed in evaporator tube 20. An outlet 36 for discharging condensed vapour or liquid and/or uncondensed vapour is provided at the bottom of evaporator tube 20 to one side for discharging material 37 from tube 20 as will be described in more detail below.

In operation of this form of the apparatus of the present invention, feed stream 10 comprising two or more components of varying specific gravities or differing volatilities, such as waste water contaminated with alcohol, or an aqueous material containing milk solids or the like, is fed under pressure into housing 4 through inlet 8 to fill chamber 6. It is to be noted that feed stream 10 can be at any desirable or suitable temperature. After entering housing 4, the liquid stream enters the inlet ports 16 of the ISG 14 and travels through passages 17 to emerge from the discharge ports 18 in a swirling or rotary motion as indicated by arrows A and B. The inside of evaporator tube 20 and chamber 34 is maintained under a vacuum set in accordance with the particular requirements of the actual materials present in the in-feed stream 10 and the conditions for separating these materials. Accordingly, as the components of the feed stream 10 exit from the ISG 14 they immediately encounter a negative pressure zone maintained within tube 20 in chamber 34, whereupon the more volatile liquid compounds boil and produce vapour which flows into chamber 34. Thus, the lower boiling point component of the feed material undergoes flash vaporisation due to the decrease in pressure and temperature exchanges in accordance with the Ranque-Hilsch vortex tube effect. A further effect of the decrease in pressure is to accelerate the vapour to a high velocity. Thus, the combined effect of imparting a swirling motion to the feed material to increase its velocity and subjecting it to a large drop in pressure has the effect of accelerating the material to an even higher velocity than is achievable by using the ISG alone. This in turn affects the subsequent motion of the different components. Heavier liquids are thrown outwardly at high speed towards the wall 24 of the chamber 34 to contact the wall of tube 20 as shown generally by the flow of arrow A and spiral down this wall in a thin liquid film 38. Vapours and non-condensable gases on the other hand spiral at high velocity towards the centre of tube 20 and down and around the region of the central axis of the tube to form a core 40 of the material flow, as shown generally by the flow of arrow B. Thus, by this combined effect the more volatile component is vaporised and tends to follow a pathway down the centre of tube 20 whereas the less volatile component is not vaporised and tends to flow down the wall of tube 20, thereby effecting separation of the two components to a greater or lesser extent.

The liquid spiralling down the wall 24 of the jacket 20 condenses some of the higher boiling temperature vapours in the inner core 40 of the spiral flow due to heat transference from the vapours to the liquid which allows the lower boiling temperature vapour to remain as vapour while the high velocity spiralling liquid continues down the wall of the chamber together with a reduced quantity of low boiling temperature vapour so that both can exit through the chamber outlet 36 as a combined flow 37.

The introduction of ISG 14 adjacent the inlet of feed material allows a better distribution of the inlet feed material to the evaporator tube 20, thereby allowing more efficient separation.

Alternatively, in another embodiment there is the possibility of allowing hot liquid or gas to enter the jacket 26 in place of coolant 32 where the liquid or gas is at a temperature of 1° C. or more in excess of that of the liquid within tube 20 and chamber 34 so that additional vaporisation of the spiralling liquid against the walls of the tube occurs due to increased heat exchange and increases the rotational velocity of the liquid inside tube 20 thereby increasing the amount of vaporisation of this component which in turn increases the amount of material passing through chamber 34 and exiting this chamber through outlet 36. It is to be noted that both liquid and vapour are discharged simultaneously from outlet 36 in that the liquid tends to collect at the bottom of and along the lower surface of chamber 34 and outlet 36 whereas the vapour ends to collect in the upper region of outlet 36. The vapour and liquid being discharged through outlet 36 are fed to a further separator to complete separation of the liquid and vapour into two distinct streams as shown more clearly in FIG. 4. Thus, the hydrocyclonic evaporator or Cyclovap of the present invention is in effect a pre-treatment for separating two components.

The evaporator tube 20 can be from 1 to 20 meters in length or even longer. The thin liquid film 38 flowing down the wall 24 of the tube 20 and inside chamber 34 is partially cooled by the coolant 32 circulating in jacket 26.

Figure 2:
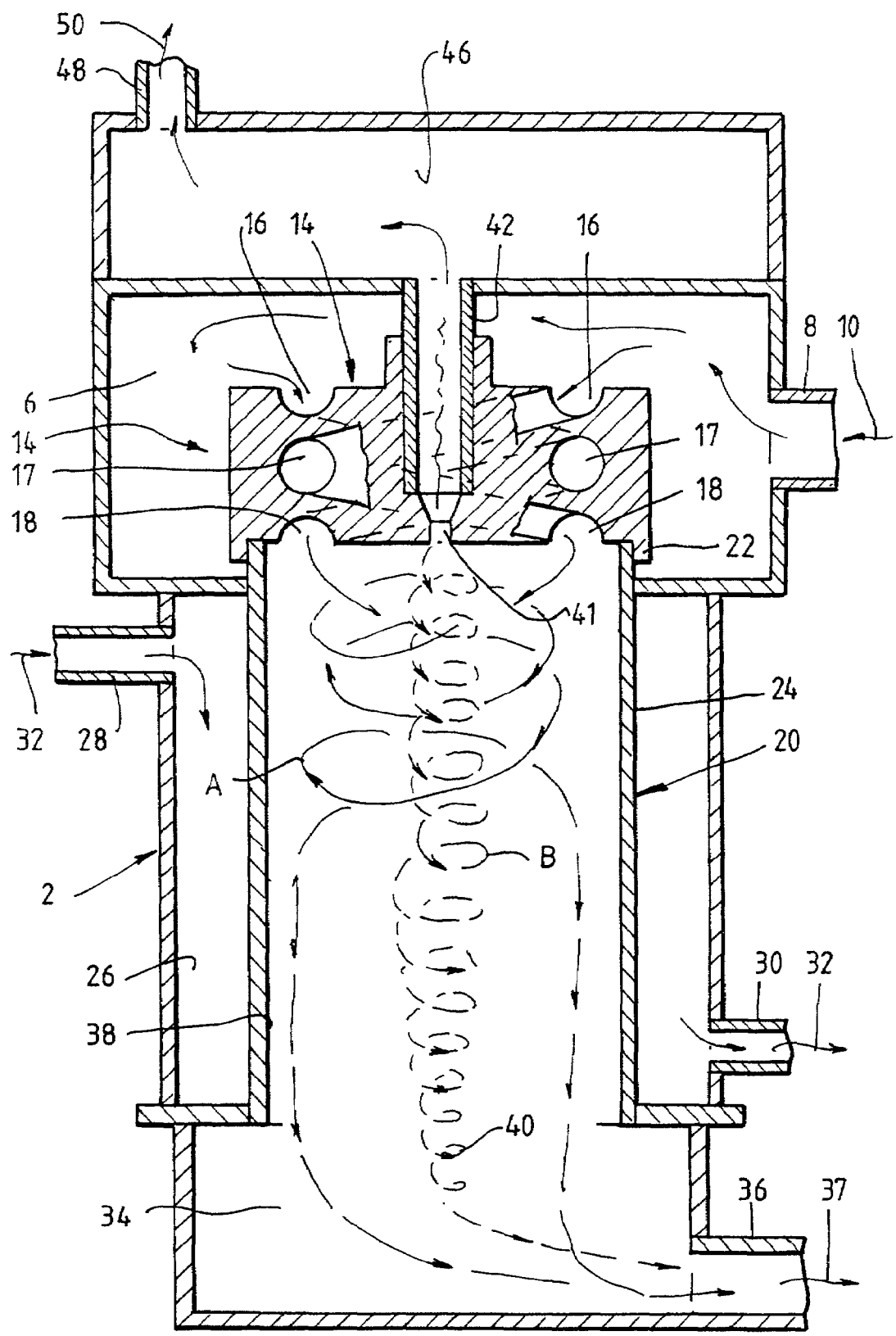
FIG. 2 is a vertical cross-section of a further embodiment of the cyclonic evaporator of the present invention also having a single evaporator tube.

A modification of the embodiment described above is shown in FIG. 2, in which there is a reject nozzle 40 fitted to the housing 4 allowing vapour to escape upwardly into a secondary chamber 46 located at or towards the top of the housing. In this embodiment, similar reference numerals are used to denote corresponding features of the embodiment of FIG. 1. In the embodiment of FIG. 2, there is a reject nozzle 40 located in the bottom surface of ISG 14 which nozzle is in fluid communication with reject conduit 42 extending internally through ISG 14 about the central axis of ISG 14 to upper chamber 46 located above housing 4. Upper chamber 46 is provided with outlet 48 for discharging vapours 50 from chamber 46. This embodiment is particularly adapted to remove air and other gases from the feed stream, particularly where the feed stream is aerated. In operation of this form of the apparatus of the present invention, feed material containing air or other gas, such as for example nitrogen, is admitted through inlet 8 to chamber 6 in housing 4 whereupon it enters ISG 14. On entering inlet ports 16, the feed material is forced through passages 17 to emerge through discharge ports 18 in a swirling motion. As chamber 34 is under vacuum, there is a sudden drop in pressure on transiting from ISG 14 to evaporator tube 20. In combination with the swirling motion and drop in pressure, the air or gas has a tendency to collect in a central core in tube 20, whereas the less volatile liquid material is thrown towards the outside of the tube against walls 24, such as is shown by flow A. The more volatile material tends to adopt a flow path intermediate the central core of gas B and the outer flow of liquid A.

The air or other gas in the flow path of the central core of tube 20 rises in tube 20 to enter reject nozzle 40 and flow through reject conduit 42 to upper chamber 46 and then to outlet 48, whereupon the gas is discharged from the apparatus as gas flow 50.

Simultaneously with the air or gas moving upwardly through reject nozzle 40 and conduit 42, the vapour in the intermediate flow path travels towards outlet 36 for discharge through outlet 36 whilst the liquid in the outer flow path B adjacent wall 24 spirals down the wall to accumulate at the bottom of chamber 34 for discharge along the lower portion of outlet 36. It is to be noted that the vapour of flow B is discharged simultaneously with the liquid of flow A through outlet 36.

Figure 3:
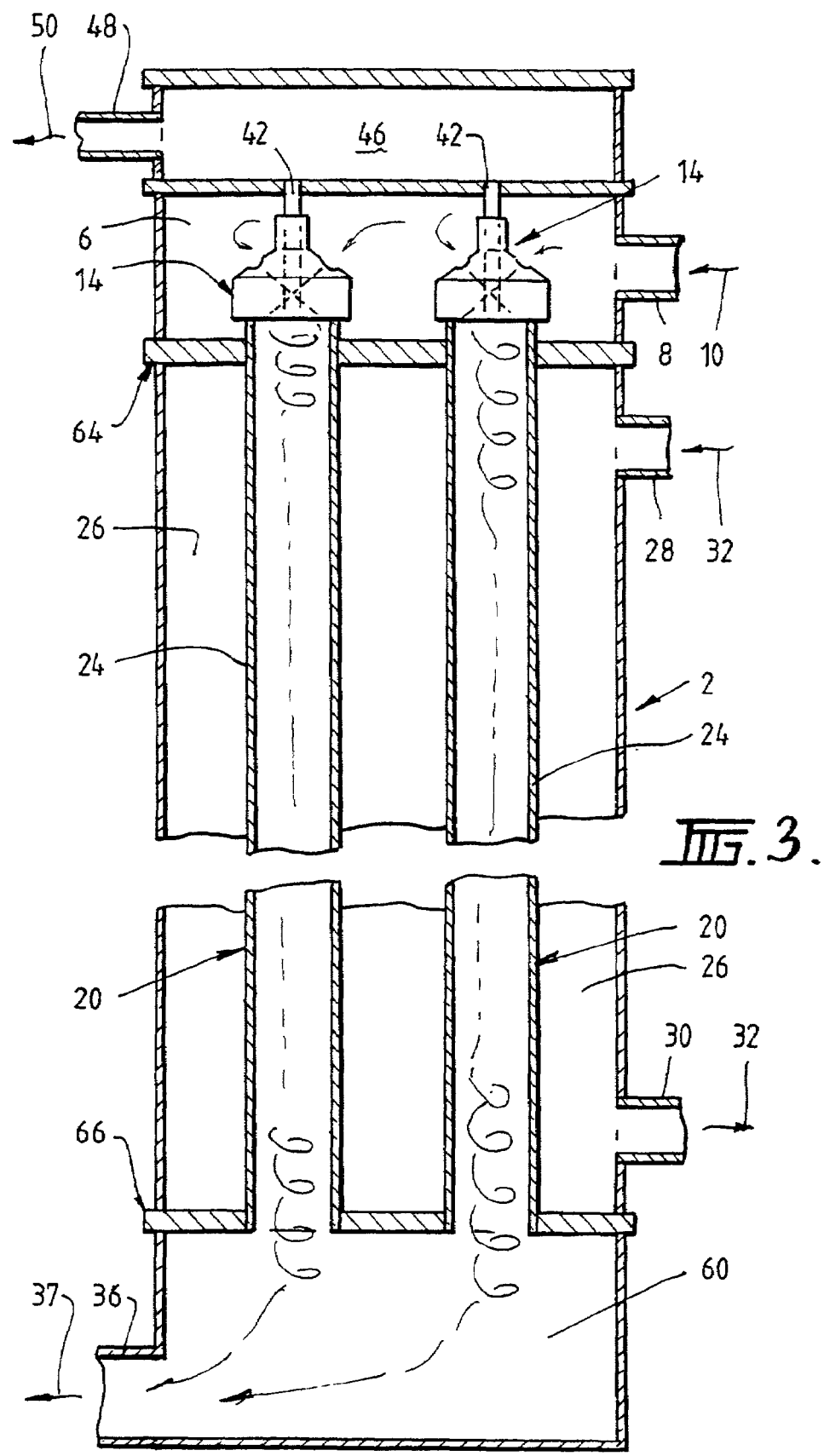
FIG. 3 is a vertical cross-section of a still further embodiment of the cyclonic evaporator of the present invention having two evaporator tubes.

In FIG. 3 there is shown a further embodiment of the present invention in which there are a multiple of individual evaporator tubes 20 located within the one housing. Although only two evaporator tubes 20 are shown, the apparatus can have any number of tubes 20. Each evaporator tube 20 is provided with its own ISG 14 located at or towards the top. It is to be noted that evaporator tube 20 can take a number of different forms. One such form is a tube having parallel sides, which tubes are aligned with their sides in spaced apart parallel relationship to each other and to the sides of the evaporator so that all of the walls are parallel. In another form, the evaporator tubes have stepped sides which are stepped down from a larger diameter located towards the input end (top) of the tube to a relatively narrower diameter located at the output end (bottom) of the tubes near to outlet 36. In another form of the tube, the sides are tapered so as to define a relatively larger diameter at the input end of the tubes to a relatively smaller diameter at the outlet end of the tubes. Further, it is to be noted that any combination of tubes, including tubes of the same configuration or different configurations, can be used as inserts in the apparatus of the present invention.

Having tubes of varying diameters and profiles considerable enhances the performance of the Cyclovap of the present invention as even higher vapour velocities can be produced as the water or volatile vapour passes down the side walls of the tube inserts within the evaporator housing column.

Various profiles of the evaporator tubes 30 can be used in the embodiment shown in FIG. 3 to produce varying velocities and film coefficients for evaporation. Volatile vapour components can be removed from the flash evaporation chamber via small holes provided in the smaller diameter support tubes 20 which allows the volatile vapours to be drawn into the chamber 46.

The higher velocities obtained by the tube insert prevents very viscous products from attaching and forming onto the internal walls of the main evaporator column heating jacket 26.

Figure 4:
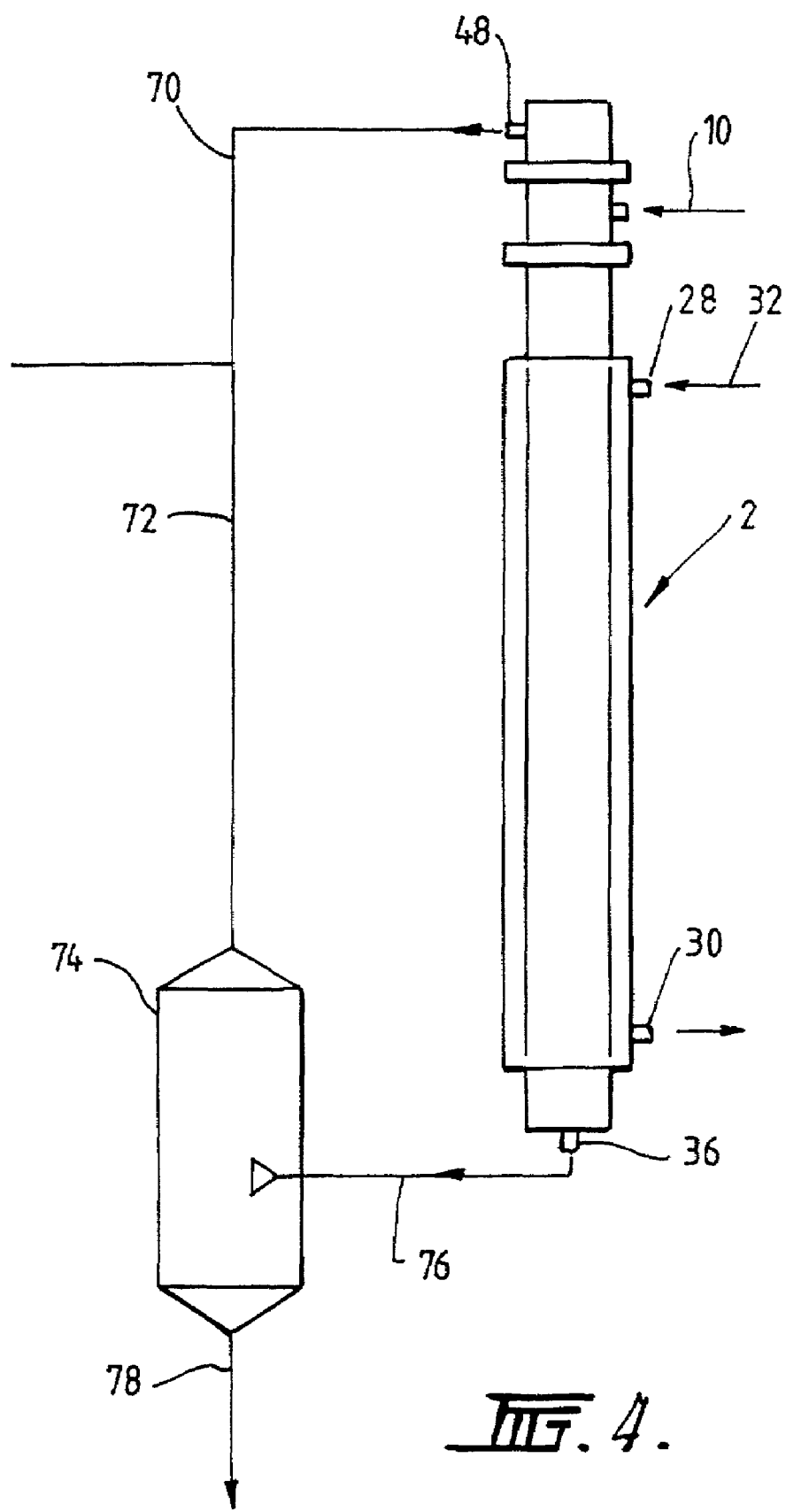
FIG. 4 is a flow chart showing use of the cyclonic evaporator of the present invention in situ in one industrial process.

The embodiment of FIG. 3 and similar systems are applicable to the Cyclovap as shown in FIG. 4. It is however possible also to use the Cyclovap in a vertical up feed rather than a vertical down feed. Thus, in the system of FIG. 4, the feed material can be introduced at or towards the base of column 20 and discharged from the top of the apparatus 2.

The operation of the form of the apparatus of the present invention as shown in FIG. 3 is similar to the operation of the previously described forms. In this form of the invention, material 10 entering inlet 8 under pressure flows under pressure to each ISG 14 so that the material entering each of the respective inlet ports of each ISG 14 is at the same pressure which enhances even distribution of material to each individual evaporator tube 20 to achieve more efficient separation of the components. In the embodiment shown in FIG. 3, each ISG is provided with a centrally located reject nozzle 42 in fluid communication with upper chamber 46. The arrangement shown in FIG. 3 enables feed material to be uniformly and evenly distributed to each evaporation tube 20 which results in more even distribution of the incoming feed material and more efficient separation of the components of the feed material.

The vapours and liquid emerging from the base of tube 20 are collected in chamber 60 for discharge through outlet 36. Upper separation plate 64 maintains individual tubes 20 in spaced apart relationship at the top of tubes 20, whereas lower separation plate 66 maintains the lower end of individual tubes 20 in spaced apart relationship. This, coupled with more efficient heat transfer caused by having individual evaporator tubes 20 as inserts within the evaporator body or housing, enables better control over the operation of the evaporator, thereby permitting more efficient separation of the components of the feed material.

After the pre-treatment of the feed material in the Cyclovap of the present invention, the feed material is passed to a further separation apparatus as will now be described.

FIG. 4 is a flow chart showing one example of where the apparatus of the present invention can be used as part of an overall industrial process. In the embodiment shown in FIG. 4, feed 10 is introduced in the cyclonic evaporator 2 and coolant 32 is admitted to jacket inlet 28 and discharged through outlet 30. Vapour is discharged from cyclonic evaporator through outlet 48 to conduit 70 and then via conduit 72 to primary separator 74. Primary separator 74 receives vapour and liquid from outlet 36 through conduit 76 and separates this material into a vapour which is discharged through line 72 to join with line 70 for subsequent processing. Conduit 78 from separator 74 carries liquid for further processing. Thus, the apparatus of the present invention can be used as a pre-treatment step to the primary separation of components.

Examples of use of the apparatus of the present invention will now be described.

EXAMPLE 1

Mango Puree

The product feed material to be separated was mango puree at 14° Brix and full fibre content.

The product was pre-heated to 60° C. before being pumped into the Cyclovap. The outside heating jacket 26 of the Cyclovap 2 was heated by low pressure steam at 115° C., the mango puree feed material was pumped into the Cyclovap 2 at 60° C. which provides 10° C. of flash to allow essence (aroma) to be removed through vapour nozzle 40 and be recovered as essence enriched condensation. Mango puree continued flowing downwards in evaporation tube 2 past the steam heating jacket 26, whilst the inside of the Cyclovap 2 was under vacuum which caused the water phase of the mango puree to boil at 50° C. During the downward passage the mango puree (and water) was re-heated by the steam jacket 26 thus causing the water phase to continually boil off and form vapour.

Mango puree which by now was concentrated to 30° Brix together with water vapour was discharged through outlet 36 at the bottom of the Cyclovap 2 and entered the vapour separator 74 where the mango puree at 30° Brix was pumped out of the bottom 78 of the separator and the water vapour taken out of the top through conduit 72 of separator 74 for condensing.

Visual inspection of the heating surface inside the Cyclovap 2 showed no sign of product deposition. The plant had been operated with a tube insert of a plurality of tubes as shown in FIG. 3 in position within the apparatus 2.

EXAMPLE 2

Coconut Milk

The product feed material to be separated in this example was coconut milk at 10% total solids non-fat, and 15% fat content.

Feed product was pre-heated to 70° C. before being pumped into the Cyclovap 2. The outside heating jacket 26 of the Cyclovap 2 was heated by low pressure steam at 90° C., and the coconut milk was pumped into the Cyclovap at 70° C. which provided 20° C. of flash. The coconut milk continued its passage downwards within tube 20 past the steam heating jacket 26. The inside of the Cyclovap 2 was under vacuum which caused the water phase of the coconut milk to boil at 50° C. During the downward passage the coconut milk (and water) was re-heated by the steam jacket 26, thus causing the water phase to continuously boil off and form vapour. Coconut milk which was now concentrated at 60% total solids together with the water vapour was discharged through outlet 36 at the bottom of the Cyclovap 2 and entered the vapour separator 74 where the coconut milk at 60% total solids was pumped out of the bottom of the separator 74 through conduit 78 and the water vapour taken out of the top of the separator 74 via conduit 72 for condensing. Visual inspection of the heating surface inside the Cyclovap shown no sign of product deposition. The plant had been operated with a tube insert of a plurality of tubes 20 in position.

EXAMPLE 3

Brewer's Yeast Washwater—Ethanol Recovery

The feed product of this example requiring separation into its constituent components was brewer's yeast washwater containing 6% ethanol.

The feed product material was preheated to 75° C. and pumped to the Cyclovap 2 which was operated with a vacuum inside the machine of minus 27 inches of mercury.

The brewer's yeast washwater entered the Cyclovap 2 through the (ISG) and flash evaporation took place within the inlet chamber, thus allowing the ethanol to vaporise together with some water. This ethanol/water vapour passed down the column of evaporator tube 20 and into the column jacket area which had water flowing through the jacket 26 at a temperature of 38° C. At this temperature, partial condensation was allowed to take place and this allowed a quantity of the water vapour to be condensed whilst the ethanol remained as a vapour.

The ethanol vapour and partially condensed water as well as washwater entered the vapour separator 74 resulting in the ethanol discharging from the vapour separator at the top through conduit 72 whilst the washwater with only 0.1% ethanol was pumped out of the bottom of the separator through conduit 78.

The ethanol vapour was fully condensed by a supplementary heat exchanger and the resulting ethanol concentration achieved was 30% by volume.

EXAMPLE 4

Wine Marc Extract (Red)—Ethanol Recovery

The feed product of this example to be separated into components was wine marc extract which is generated from the fermented skins of red grapes following fermentation. This product contains 4% volume ethanol.

The feed product containing 4% volume ethanol was preheated to 95° C. and the product pumped to the Cyclovap 2 which was operated with a vacuum of minus 27 inches of mercury.

The product entered the ISG at 95° C. and flashed into the Cyclovap column where flash evaporation took place within the inlet chamber, thus allowing the ethanol to vaporise together with some water. This ethanol/water vapour passed down the column 20 and into the column jacketed area which had water flowing through the jacket 26 at a temperature of 40° C. At this temperature, partial condensation was allowed to take place and this allowed a quantity of the water vapour to be condensed whilst the ethanol remained as a vapour.

The ethanol vapour and partially condensed water as well as marc extract entered the vapour separator 74 resulting in the ethanol discharging from the vapour separator 74 at the top via conduit 72 whilst the marc extract with 0.5% ethanol was pumped out of the bottom of the separator via conduit 78.

The ethanol vapour was fully condensed by a supplementary heat exchanger and the resulting ethanol concentration achieved was 38% by volume.

EXAMPLE 5

Glycol Concentration

The feed product to be separated in this example was a 10% glycol solution which is used as a refrigerant. It was necessary to remove the water phase and concentrate the glycol by batch processing. For this process, the Cyclovap 2 was modified to a rising evaporator system with the ISG at the bottom and the vapour separator at the top, which is the inverse position to that shown in FIGS. 1 to 3.

Glycol was circulated via a small feed and steam was applied to the vertical column of the Cyclovap 2 to heat the glycol to 80° C. after which a vacuum was pulled on the Cyclovap column 20 through the vapour separator.

Steam at a temperature of 100° C. was maintained on the jacket 26 of the Cyclovap 2 and glycol was evaporated to produce a vapour. This vapour entered the vapour separator which had a controlled vacuum at 16 inches of mercury, thus vaporising the glycol but not the water phase.

The glycol vapour was carried from the top outlet of the vapour separator to a condenser where it was condensed and fed to a collection vessel.

Water which was glycol reduced was fed back to the feed tank from the bottom outlet of the vapour separator.

This process continued until the quantity of liquid remaining in the feed tank was approximately 15% of the original volume. Upon completion of the trial, the glycol concentration had increased to 90%.

Advantages of the present invention include being able to accurately or at least more evenly distribute liquids from the main feed stream to the evaporation tubes so that more efficient evaporation can take place, particularly when a cylindrical form of the housing is used, and more particularly when an insert of a plurality of evaporation tubes are used.

More effective cleaning of the housing is possible since there are no distribution plates having apertures which can block, trays or like baffles located in the housing to prevent effective cleaning in situ.

The ability to produce very high velocity rotating liquid directly to the evaporator tube and chamber is possible.

Flow down the length of the inner wall of the tube or chamber prevents fouling deposits on the inner tube walls and the like.

The provision of the in-line swirl generator allows flash evaporation into tube 20 to take place, followed by immediate partial condensing or condensation of the vapours produced during the flash evaporation. This is possible by allowing cooling fluid or gas to be applied to the chamber walls to effect partial condensation or condensation of the vapours in the evaporation tube.

The apparatus of the present invention provides the ability to allow volatile vapours or non-condensable gases to be removed from the top of the chamber through the reject nozzle. Additionally, the size of the reject nozzle can be varied which allows adjustment of the amount of volatile vapours or non-condensable gases to be removed from the evaporation chamber through the reject nozzle. Higher boiling temperature vapours can be immediately condensed or partially condensed by allowing cooling fluid or gas to be applied to the chamber walls.

The present invention provides the ability to allow flash evaporation or evaporation and condensing or partial condensing to take place in a single or multiple tube evaporator cylinder by adjusting the length of the cooling chamber along the length of the chamber wall.

The described arrangement has been advanced by explanation and many modifications may be made without departing from the spirit and scope of the invention which includes every novel feature and novel combination of features hereindisclosed.

Those skilled in the art will appreciate that the invention described herein is susceptible to variations and modifications other than those specifically described. It is understood that the invention includes all such variations and modifications which fall within the spirit and scope.

What is claimed is:

1. A cyclonic evaporator apparatus for separating two or more components of a feed material prior to or simultaneously with at least partially vaporizing one of the components, said cyclonic evaporator including a swirl generator portion for imparting a swirling motion to the feed material, and said cyclonic evaporator also an evaporator portion having one or more evaporator tubes for heat exchange, said swirl generator portion having at least one inlet located at or towards one side of the swirl generator for admitting feed material containing the at least two components to the swirl generator in a direction substantially tangentially to the center line of the cyclonic evaporator, an arrangement located within the generator for imparting a swirling motion to the feed material about the center line of the cyclonic evaporator, and an outlet located at or towards one end of the swirl generator for discharging the at least two components of the feed material from the swirl generator in a swirling motion generally axially in a direction substantially parallel to the center line of the evaporator wherein at least one of the components of the feed material is subjected to at least partial flash vaporization on being discharged from the outlet of the swirl generator into the evaporator to further assist in separating the two components from each other so that the components are discharged from the swirl generator into the evaporator at least partially separated into at least two streams in which one stream forms a central core flow path and the other stream is an outer radial flow path.

2. An apparatus according to claim 1 in which movement of the feed material through the arrangement for imparting a swirling motion to the feed material imparts a spiralling motion to the feed material passing through the swirl generator.

3. An apparatus according to claim 2 in which the arrangement for imparting a swirling motion is a single conduit or two or more conduits or passageways located within the swirl generator.

4. An apparatus according to claim 1 in which the swirl generator is a tangential flow swirl generator in that the inlet of the swirl generator is substantially arranged in an axial direction of the apparatus for receiving tangential flow from the inlet of the apparatus and the outlet is arranged to discharge the components in a axially swirling motion.

5. An apparatus according to claim 1 in which the evaporator is formed from a single evaporation tube.

6. An apparatus according to claim 1 in which the evaporator is formed from a plurality of evaporation tubes wherein each evaporation tube is provided with a swirl generator such that the components of the feed material are introduced into each evaporation tube in a swirling motion produced as a result of passing the feed material through the swirl generator.

7. An apparatus according to claim 6 in which the plurality of evaporation tubes have a variety of different diameters.

8. An apparatus according to claim 1 in which the swirl generator is provided with a reject nozzle for allowing vapour to pass through the swirl generator when introducing a swirling movement to the feed material for discharge from the apparatus.

9. An apparatus according to claim 8 in which the reject nozzle is located in the lower surface of the swirl generator.

10. An apparatus according to claim 8 in which the reject nozzle is in fluid communication with a reject conduit extending internally through the body of the swirl generator to allow vapor to pass through the swirl generator for discharge from the apparatus.

11. An apparatus according to claim 1 in which there is a further flow path intermediate the central core flow path and the outer radial flow path formed in the evaporation tube or tubes of the evaporator.

12. An apparatus according to claim 1 in which the evaporator tube or tubes forming the evaporator are provided with parallel sides, stepped sides or tapering sides.

13. An apparatus according to claim 1 in which the evaporation tube or tubes are arranged to extend substantially vertical within the evaporator portion.

14. A method of separating one component from another component of a feed material using a cyclone evaporation apparatus having a swirl generator portion and an evaporator portion, including admitting the feed material containing the two components to be separated from one another to the swirl generator portion forming one part of the evaporation apparatus to impart a swirling motion to the feed material for at least partially separating the components from each other and to enhance the vaporisation of at least one of the components, passing the feed material through the swirl generator, vaporizing at least part of the one component in the evaporator portion, separating the one component from the other component by the one component having a tendency to remain as a vapour in the apparatus whereas the other component has a tendency or propensity to be condensable to a liquid in the apparatus, and discharging the one and the other components from the apparatus in at least partially separated streams whereby separation of the two components is substantially maintained, wherein one of the components of the feed material undergoes at least partial flash vaporisation on emerging from an outlet of the swirl generator and there is a central core flow path and an outer radial flow path within the evaporator portion.

15. A method according to claim 14 in which the feed material introduced through the inlet of the swirl generator is an aqueous waste material or an organic solvent based waste material.

16. A method according to claim 15 in which the feed material introduced into the inlet of the swirl generator is an aqueous waste material having alcohol.

17. A method according to claim 16 in which the alcohol is methanol, ethanol, propanol or the like.

18. A method according to claim 14 in which the waste material is a fruit juice syrup containing water residues in which separation of the water from the fruit juice concentrate is required.

19. A method according to claim 14 in which one of the components of the waste material undergoes flash vaporisation on emerging from the swirl generator portion to the evaporator portion.

20. A method according to claim 19 in which the more volatile of the two components of the waste material undergoes flash vaporisation.

21. A method according to claim 19 in which evaporation of the first component is continued in the body of the evaporator.

22. A method according to claim 19 in which at least one of the components being separated from the feed stream is subjected to the Ranque-Hilsch vortex tube effect thus causing rapid transfer of heat from one component to another component within the evaporator tube.

23. A method according to claim 14 in which the velocity of the components of the feed stream is increased by passage through the swirl generator.

24. A method according to claim 14 in which the swirl generator is operated under pressure.

25. A method according to claim 24 in which the evaporation apparatus is provided with an evaporation chamber and the evaporation chamber is operated under partial vacuum at least, so that when one or more components emerge from the high pressure zone of the swirl generator to the evaporator chamber, the component undergoes flash vaporisation which further increases the velocity of the component or components.

* * * * *